United States Patent
Lee et al.

(10) Patent No.: US 11,002,910 B2
(45) Date of Patent: May 11, 2021

(54) FIBRE OPTIC FUSION SPLICER

(71) Applicant: SOLTECH INFONET CO., LTD., Seoul (KR)

(72) Inventors: Chang Hoon Lee, Yongin-si (KR); Kyung Jin Youn, Suwon-si (KR); Kyeong Ho Sun, Seongnam-si (KR); Byung Chul Park, Gunpo-si (KR); Chang Bae Lee, Uiwang-si (KR); Ji Won Lee, Seoul (KR)

(73) Assignee: SOLTECH INFONET CO., LTD., Seoul (KR)

(*) Notice: Subject to any disclaimer, the term of this patent is extended or adjusted under 35 U.S.C. 154(b) by 256 days.

(21) Appl. No.: 16/305,038

(22) PCT Filed: Apr. 7, 2017

(86) PCT No.: PCT/KR2017/003837
§ 371 (c)(1),
(2) Date: Nov. 27, 2018

(87) PCT Pub. No.: WO2018/097420
PCT Pub. Date: May 31, 2018

(65) Prior Publication Data
US 2020/0319407 A1    Oct. 8, 2020

(30) Foreign Application Priority Data
Nov. 22, 2016   (KR) .................. 10-2016-0155862

(51) Int. Cl.
*G02B 6/25*     (2006.01)
*G02B 6/255*    (2006.01)
(Continued)

(52) U.S. Cl.
CPC ......... *G02B 6/2553* (2013.01); *G02B 6/2555* (2013.01); *G02B 6/3616* (2013.01);
(Continued)

(58) Field of Classification Search
CPC .. G02B 6/2553; G02B 6/2555; G02B 6/3616; G02B 6/3837; G02B 6/3838; G02B 6/3847
(Continued)

(56) References Cited

U.S. PATENT DOCUMENTS

| | | | |
|---|---|---|---|
| 7,699,541 B2 | 4/2010 | Ozawa et al. | |
| 2005/0276549 A1* | 12/2005 | Tabata | G02B 6/3636 385/96 |

(Continued)

FOREIGN PATENT DOCUMENTS

| | | |
|---|---|---|
| KR | 10-2013-0063770 A | 6/2013 |
| KR | 10-2013-0140911 A | 12/2013 |

(Continued)

OTHER PUBLICATIONS

International Search Report in International Application No. PCT/KR2017/003837 dated Jun. 15, 2017, 3pages.

*Primary Examiner* — Jerry M Blevins
(74) *Attorney, Agent, or Firm* — Park, Kim & Suh, LLC

(57) ABSTRACT

The present invention relates to a fibre optic fusion splicing technique, in particular to a fibre optic fusion splicer for reliable and stable fibre optic fusion splicing, that is characterized by comprising: an alignment part for fixing and aligning first and second optical fibres that are to be fusion spliced; a fusion splicing module having an electrode bar for fusion splicing the first and second optical fibres that are fixed to and aligned in the alignment module; an optical module for photographing the aligned state of the first and second optical fibres aligned by the alignment module, and the fusion-spliced state of the first and second optical fibres fusion-spliced by the fusion splicing module; a support part (Continued)

in which the fusion splicing module and the optical module are mounted; and a lift module for moving the support part up and down.

9 Claims, 3 Drawing Sheets

(51) Int. Cl.
  *G02B 6/36* (2006.01)
  *G02B 6/38* (2006.01)
(52) U.S. Cl.
  CPC ......... *G02B 6/3837* (2013.01); *G02B 6/3838* (2013.01); *G02B 6/3847* (2013.01)
(58) Field of Classification Search
  USPC .......................................................... 385/96
  See application file for complete search history.

(56) References Cited

U.S. PATENT DOCUMENTS

2009/0136186 A1\* 5/2009 Ozawa ................. G02B 6/2551
                                                              385/96
2010/0284653 A1\* 11/2010 Tamekuni ............ G02B 6/3846
                                                              385/60

FOREIGN PATENT DOCUMENTS

| KR | 10-2014-0004719 A | 1/2014 |
| KR | 10-2014-0027511 A | 3/2014 |
| KR | 10-2016-0100175 A | 8/2016 |

\* cited by examiner

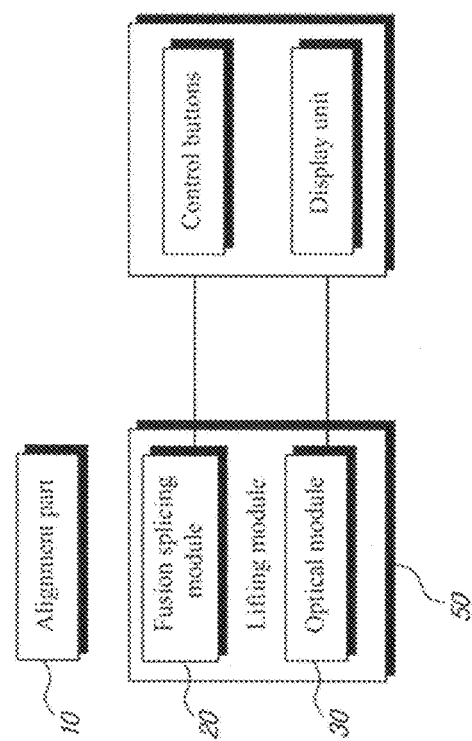
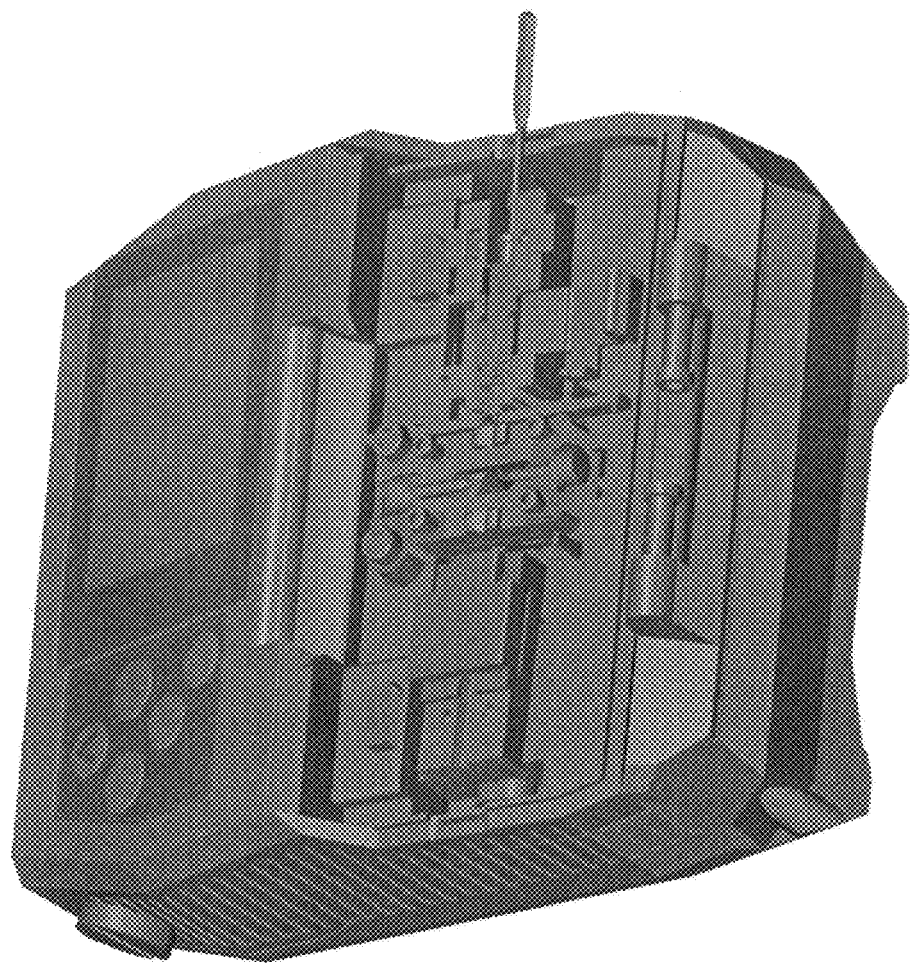
FIG. 1

FIBRE OPTIC FUSION SPLICER

CROSS-REFERENCE TO RELATED APPLICATIONS

This application is the National Stage filing under 35 U.S.C. 371 of International Application No. PCT/KR2017/003837, filed on Apr. 7, 2017, which claims the benefit of Korean Patent Application No. 10-2016-0155862, filed on Nov. 22, 2016, the contents of which are all hereby incorporated by reference herein in their entirety.

FIELD OF THE INVENTION

The present invention relates to optical fibre fusion technology and, more particularly, to a fibre optic fusion splicer that can perform reliable and stable optical fibre fusion.

BACKGROUND ART

Generally, optical fibres (or optical cables) are used for transmitting optical signals. Herein, unlike wires that transmit electrical signals, optical fibres are capable of transmitting a large amount of information at an ultra-fast rate without any data loss.

Since manufacturers are incapable of manufacturing optical cables at an endlessly long length, optical cables are generally manufactured at a length of approximately 2 kilometers (km) and wounded around a drum. Therefore, in order to install the optical cables to a very distant location, the optical cables are required to be connected to one another or ramified along the way.

However, since an inner core of the optical cable is configured of optical fibres having an extremely small diameter, it is very difficult to connect the optical fibres to one another.

A fusion splicing method using a fibre optic fusion splicer and a mechanical splicing method using an optical adaptor or an optical connector are generally used as the optical fibre splicing method.

The important factors of the fibre optic fusion splicer that is used in the fusion splicing method correspond to accurately and stably aligning optical fibre, stably separating fusion-spliced optical fibres from the fusion splicer without damaging the spliced part after splicing the optical fibres, eliminating alignment errors that occur during the mechanical maneuvering (or operation) of the fibre optic fusion splicer or the mechanical coupling of the configuration elements of the fibre optic fusion splicer, and so on.

Therefore, the related art fusion splicing technology requires solutions for the above-described optical fibre alignment, stable separation, elimination of alignment errors, and so on.

Meanwhile, the Korean Patent Application Publication No. 10-2014-0004719 discloses a method for fusion connection of optical fibres to each other, and a fusion connection machine. Herein, fusion splicing is achieved as electrode bars discharge electricity, after a holder accommodating optical fibres is coupled with the fusion splicer, and after the optical fibres are aligned in the v-grooves. After completing fusion splicing, the fusion splicing operation is completed by separating the holder from the fusion splicer. The corresponding Korean patent application introduces a technology that reinforces a fused part of the optical fibres by equipping (or providing) a reinforcing member at a rear end of a ferrule and by having the reinforcing member overlap the optical fibres so as to cover the optical fibres. However, when applying the corresponding Korean patent application, during the process of separating the optical fibres from the fusion splicer after fusing the optical fibres, the electrode bars or v-grooves were often the cause of damage.

DETAILED DESCRIPTION OF THE INVENTION

Technical Objects

An object of the present invention has been devised in consideration of the above-described problems, and, most particularly, an object of the present invention is to provide a fibre optic fusion splicer that is capable of performing fusion splicing of aligned optical fibres and, then, stably separating the fusion-spliced optical fibres from the fusion splicer without causing any damage in the spliced part, and, that is also capable of eliminating alignment errors occurring during the mechanical maneuvering (or operation) of the fibre optic fusion splicer or the mechanical coupling of the configuration elements of the fibre optic fusion splicer.

Technical Solutions

In order to achieve the above-described technical object of the present invention, provided herein is a fibre optic fusion splicer including an alignment part fixing and aligning a first optical fibre and a second optical fibre that are to be fusion coupled, a fusion splicing module being equipped with electrode bars for fusion coupling the first optical fibre and the second optical fibre being fixed and aligned to the alignment part, an optical module photographing (or filming) an alignment state of the first optical fibre and the second optical fibre being achieved by the alignment part and a fusion coupling state of the first optical fibre and the second optical fibre being achieved by the fusion splicing module, a support part having the fusion splicing module and the optical module equipped thereto, and a lift module ascending and descending the lift module.

Preferably, the alignment part may include a first fixing part fixing a first holder having the first optical fibre accommodated therein, and a second fixing part fixing a second holder having the second optical fibre accommodated therein.

More preferably, the first holder being fixed to the first fixing part may accommodate a detachable optical connector including a ferrule having the first optical fibre enclosed therein, and a protective cover may be equipped to a rear end of the optical connector, the protective cover covering a fused part of the first optical fibre and the second optical fibre by being adhered while facing into the fused part. Most particularly, a pair of wing parts extending and spreading out from the first optical fibre may be coupled with the rear end of the optical connector, and the protective cover may include an elastic sheet having an adhesive deposited thereto on inner surfaces of the wing parts being mutually adhered to one another or may include silicon being deposited on the inner surfaces of the wing parts being mutually adhered to one another.

The material of the elastic sheet may correspond to any one of polyethylene, polyvinyl chloride, polyurethane, natural rubber, synthetic rubber, and a mixture of natural rubber and synthetic rubber.

Preferably, the lift module may include a cylinder tube, and a piston rod being guided to the cylinder tube and being ascended and descended.

More preferably, the support part may be fixedly coupled with the piston rod, and the fibre optic fusion splicer may further include a push-button switch for ascending and descending the lift module.

More preferably, the push-button switch may include a button unit, a lifting member descending the piston rod by applying pressure on a spring when the button unit is pushed and ascending the piston rod by using a restoring force of the spring when the button unit is pushed once again, and a fixing member fixing the lifting member to a position where the piston rod is descended or releasing the fixed state of the lifting member in accordance with the pushing operation performed on the button unit.

Effects of the Invention

According to the present invention, after performing fusion of the aligned optical fibres, an optical fibre protective cover is used to protect the spliced part. Additionally, since the optical fibre is separated from the fusion splicer while the fusion splicing module, which is equipped with electrode bars and v-grooves, is in a state of being descended by the lift module, hindering elements (electrode bars, v-grooves, and so on) that acted as the cause of damage during the separation process are eliminated in advance. Accordingly, the optical fibres may be stably separated from the fusion splicer without any damage in the spliced part.

Meanwhile, even though the fusion splicing module is descended (or lowered) by the lift module for a stable separation, since the optical module, which is used for monitoring the alignment state and the fusion coupling state, and the fusion splicing module are collectively descended, the fibre optic fusion splicer is also capable of eliminating alignment errors occurring during the mechanical maneuvering (or operation) of the fibre optic fusion splicer or during the mechanical coupling of the configuration elements of the fibre optic fusion splicer. More specifically, in case only the fusion splicing module is ascended and/or descended, while the fusion splicing module and the optical module are separated from one another, minor alignment errors may occur in accordance with the ascending and descending of the fusion splicing module. However, in case of the fibre optic fusion splicer according to the present invention, since the fusion splicing module and the optical module are coupled as a single structural body and are collectively ascended and descended accordingly, alignment error does not occur.

BRIEF DESCRIPTION OF THE DRAWINGS

FIG. 1 is a perspective diagram and a block diagram showing an overall configuration of a fibre optic fusion splicer according to the present invention.

BEST MODE FOR CARRYING OUT THE PRESENT INVENTION

Other objects, characteristics, and advantages of the present invention will be apparent based on the detailed description of the exemplary embodiment of the present invention, which will hereinafter be presented with reference to the accompanying drawings.

Hereinafter, the structure and operation of the exemplary embodiment of the present invention will be described in detail with reference to the accompanying drawings, and the description of the structure and operation of the present invention will be presented according to at least one exemplary embodiment of the present invention. And, therefore, the technical scope and spirit of the present invention and its essential structure and operation will not be limited only to the description of the exemplary embodiment presented herein.

Hereinafter, a preferred exemplary embodiment of the fibre optic fusion splicer will be described in detail.

Figure 2:
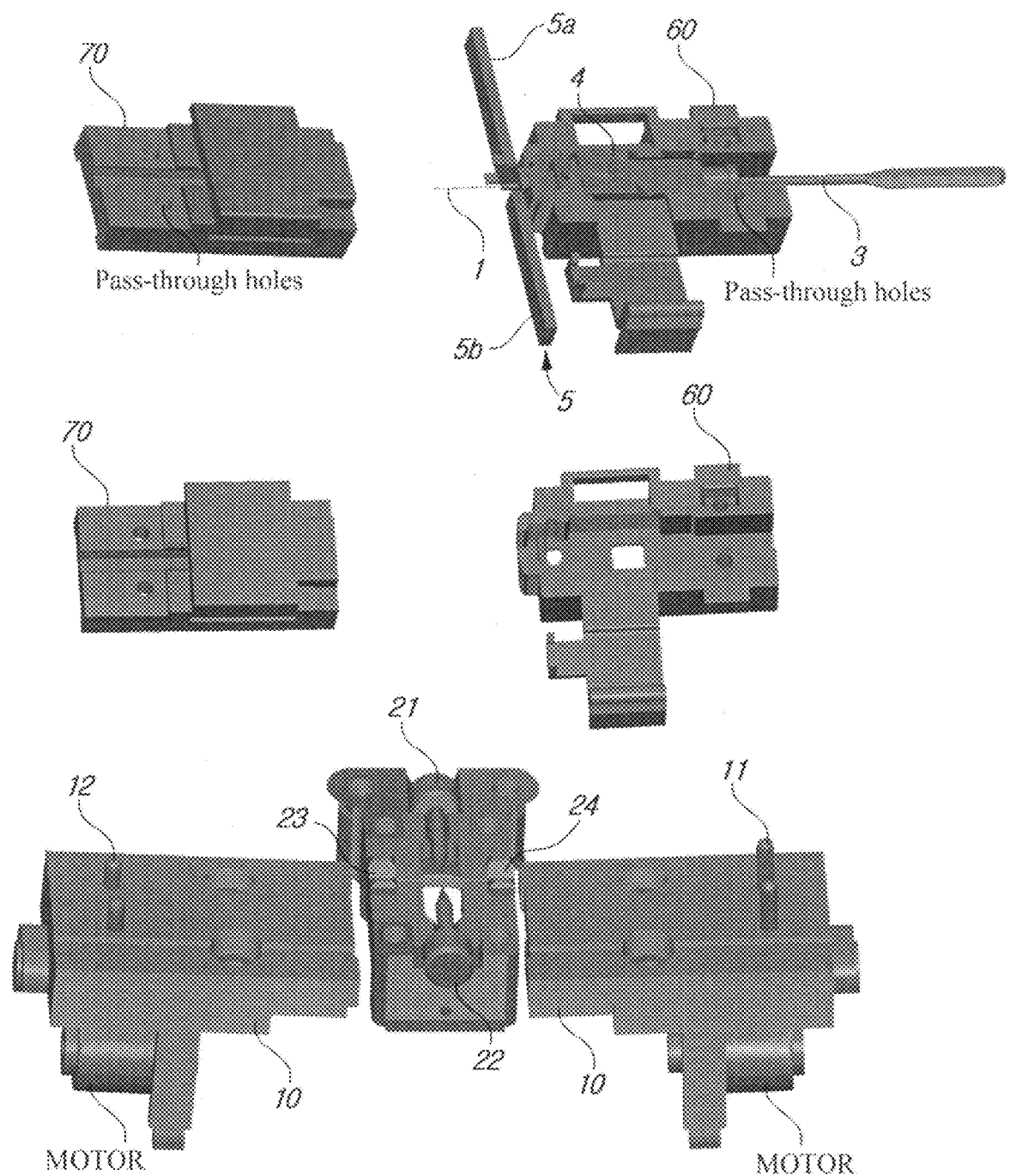
FIG. 2 is a perspective diagram showing structures of an alignment part and a fusion splicing module of the fibre optic fusion splicer according to the present invention.

FIG. 1 is a perspective diagram and a block diagram showing an overall configuration of a fibre optic fusion splicer according to the present invention. FIG. 2 is a perspective diagram showing structures of an alignment part and a fusion splicing module of the fibre optic fusion splicer according to the present invention. And, FIG. 3 is a perspective diagram showing a structure of a lift module being operatively connected to a fusion splicing module and an optical module of the fibre optic fusion splicer according to the present invention.

Figure 3:
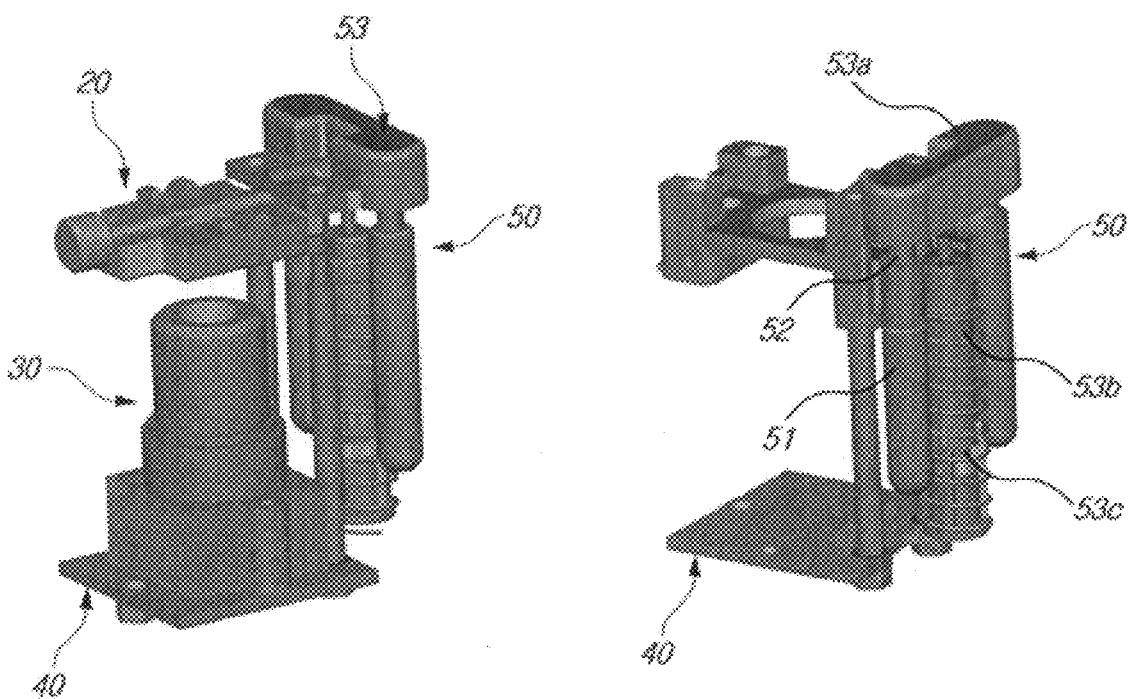
FIG. 3 is a perspective diagram showing a structure of a lift module being operatively connected to a fusion splicing module and an optical module of the fibre optic fusion splicer according to the present invention.

Referring to FIG. 1 to FIG. 3, the fibre optic fusion splicer according to the present invention includes an alignment part (10), a fusion splicing module (20), an optical module (30), a support part (40), and a lift module (50). Additionally, the fibre optic fusion splicer according to the present invention may further include control buttons for controlling operations of the alignment part (10), the fusion splicing module (20), and the optical module (30), and a display part (not shown) for displaying images taken (or photographed or filmed) by the optical module (30). The fibre optic fusion splicer may also include a battery for power supply, a power supply port, and a data communication port for transmitting and/or receiving data.

The alignment part (10) fixes and aligns first and second optical fibres (1 and 2) that are to be coupled by fusion (or fusion coupled).

The alignment part (10) may be equipped with a first fixing part (11) accommodating the first optical fibre (1), and a second fixing part (12) accommodating the second optical fibre (2).

The first holder (60) and the second holder (70) are equipped with a plurality of pass-through holes, and each of the first fixing part (11) and the second fixing part (12) may have a structure of a protruded bar that can be respectively inserted in the first holder (60) and the second holder (70). Accordingly, the first fixing part (11) and the second fixing part (12) each having the structure of a protruded bar respectively pass through the plurality of pass-through holes being provided in each of the first holder (60) and the second holder (70) so as to be fixed.

Meanwhile, the first holder (60), which is fixed to the first fixing part (11), detachably accommodates an optical connector (4), which includes a ferrule (3) having the first optical fibre (1) provided therein. Additionally, the optical connector (4) is equipped with a protective cover (5) at its rear end. Herein, the protective cover (5) is adhered to the fused part of the first optical fibre and the second optical fibre while facing into the fused part, thereby covering the fused part.

The protective cover (5) is coupled with one end, more specifically, the rear end of the optical connector (4) by having a pair of wing parts (5a and 5b) extend and spread out from the first optical fibre (1). Most particularly, a member is provided on inner surfaces of the wing parts so as to enable the adhesion of the wing parts.

For example, an elastic sheet having an adhesive deposited thereon may be provided on the inner surfaces of the wing parts. The material of the elastic sheet may correspond to any one of polyethylene, polyvinyl chloride, polyurethane, natural rubber, synthetic rubber, and a mixture of natural rubber and synthetic rubber. As another example, silicon may be deposited on the inner surfaces of the wing parts. As the elastic sheet is adhered to the inner surfaces of the pair of wing parts (5a and 5b), which configure the protective cover (5), the elastic sheet covers the fused part by enveloping the fused part with its elasticity.

Conversely, in order to prevent bending of the fused part, it is preferable that the external surfaces of the wing parts are formed of a solid material.

The first fixing part (11) and the second fixing part (12) being equipped in the alignment part (10) have a movable structure that allows the first optical fibre (1) and the second optical fibre (2) to be spliced at a fusion point that is provided between the electrode bars (21 and 22), which are equipped in the fusion splicing module (20). Therefore, the first fixing part (11) and the second fixing part (12) have a structure that is guided along a rail so as to advance (or move forward) toward the fusion point or to retreat (or move backward) from the fusion point to a predetermined range. It is preferable that a motor is provided for the forward or backward movements of the first fixing part (11) and the second fixing part (12).

The fusion splicing module (20) is equipped with electrode bars (21 and 22) discharging electricity by the supplied power, and the electrode bars (21 and 22) perform fusion coupling of the first optical fibre (1) and the second optical fibre (2), which are fixed and aligned in the alignment part (10). The fusion splicing module (20) may be further equipped with v-grooves (23 and 24), which are used for aligning the first optical fibre (1) and the second optical fibre (2). When performing fusion splicing by the electrode bars (21 and 22), which are equipped in the fusion splicing module (20), the fibre optic fusion splicer according to the present invention may be further equipped with a cover (not shown). And, the fibre optic fusion splicer according to the present invention may also be further equipped with an LED lighting device (not shown) in its inside, so as to allow the optical module (30) to photograph (or film) the inside of the fibre optic fusion splicer even when it is covered by the cover (not shown).

The optical module (30) is equipped with a lens and a camera, thereby being capable of photographing (or filming) the alignment state of the first optical fibre (1) and the second optical fibre (2), which is achieved by the alignment part (10), and photographing (or filming) the fusion coupling state of the first optical fibre (1) and the second optical fibre (2), which is achieved by the fusion splicing module (20). Thereafter, the photographed (or filmed) image(s) taken by the optical module (30) is/are displayed through a display part (not shown).

The support part (40) corresponds to a supporting structure having the fusion splicing module (20) and the optical module (30) installed thereto. Herein, the support part (40) fixes the fusion splicing module (20) and the optical module (30) in a uniform frame.

The lift module (50) ascends and descends (or lifts up and down) the support part (40) having the fusion splicing module (20) and the optical module (30) fixedly equipped thereto.

The lift module (50) is equipped with a cylinder tube (51), a piston rod (52) being guided to the cylinder tube (51) and being ascended and descended (or lifted up and down), and a push-button switch (53).

The support part (40) is fixedly coupled to the piston rod (52) so that the fusion splicing module (20) and the optical module (30) can be ascended and descended while being coupled to a structural body. As the support part (40) is fixedly coupled to the piston rod (52), the fusion splicing module (20) and the optical module (30), which are fixedly equipped to the support part (40), may be collectively ascended and descended.

The push-button switch (53) is maneuvered (or operated) by the user for the lifting up and down (or ascending and descending) of the lift module (50). Herein, the push-button switch (53) is equipped with a button unit (53a), a lifting member (53b), and a fixing member (53c).

When pushing (or pressing) the button unit (53a), the lifting member (53b) descends the piston rod (52) by applying pressure on a spring. Thereafter, when pushing the button unit (53a) once again, the lifting member (53b) ascends the piston rod (52) by using the restoring force of the spring.

The fixing member (53c) fixes the lifting member (53b) or releases the fixed state of the lifting member (53b) at a position where the piston rod (52) is descended in accordance with the push operation (or maneuver) of the button unit (53a). More specifically, when the piston rod (52) is descended as pressure is applied to the spring when the button unit (53a) is pushed, the fixing member (53c) fixes the lifting member (53b) so as to restrict the ascending (or lifting up) of the lifting member (53b). Afterwards, when the button unit (53a) is pushed once again, the lifting member (53b) releases the fixed state of the lifting member (53b), so as to allow the piston rod (52) to be ascended (or lifted up) by using the restoring force of the spring.

As the lift module (50) descends (or lowers) the fusion splicing module (20), the optical fibres that are fusion-spliced by the fusion splicing module (20) are spaced apart from the electrode bars (21 and 22) as well as the v-grooves (23 and 24) so as to be stably separated from the fusion splicer without causing any damage to the spliced part.

MODE FOR CARRYING OUT THE PRESENT INVENTION

Although the present invention has been described according to the preferred exemplary embodiment of the present invention, it will be apparent to those skilled in the art that various modifications and variations can be made in this specification without departing from the spirit or scope of this specification.

Thus, it is intended that this specification covers the modifications and variations of this invention provided they come within the scope of the appended claims and their equivalents. It is also apparent that such variations of this specification are not to be understood individually or separately from the technical scope or spirit of this specification, and all differences lying within the scope of the appended claims and their equivalents should be interpreted as being included in the present invention.

INDUSTRIAL APPLICABILITY

The fibre optic fusion splicer according to the present invention may be broadly applied in the fusion splicing technology for resolving the problems of alignment, stable separation, elimination of alignment errors, and so on, of optical fibres.

What is claimed is:

1. A fibre optic fusion splicer, comprising:
an alignment part fixing and aligning a first optical fibre and a second optical fibre that are to be fusion coupled;
a fusion splicing module being equipped with electrode bars for fusion coupling the first optical fibre and the second optical fibre being fixed and aligned to the alignment part;
an optical module photographing (or filming) an alignment state of the first optical fibre and the second optical fibre being achieved by the alignment part and a fusion coupling state of the first optical fibre and the second optical fibre being achieved by the fusion splicing module;
a support part having the fusion splicing module and the optical module equipped thereto; and
a lift module ascending and descending the support part, wherein the alignment part comprises:
a first fixing part fixing a first holder having the first optical fibre accommodated therein; and
a second fixing part fixing a second holder having the second optical fibre accommodated therein,
wherein the first holder being fixed to the first fixing part accommodates a detachable optical connector including a ferrule having the first optical fibre enclosed therein,
wherein a protective cover is equipped to a rear end of the optical connector, the protective cover covering a fused part of the first optical fibre and the second optical fibre by being adhered while facing into the fused part,
wherein a pair of wing parts extending and spreading out from the first optical fibre is coupled with the rear end of the optical connector,
wherein the protective cover includes an elastic sheet having an adhesive deposited thereto on inner surfaces of the wing parts being mutually adhered to one another or includes silicon being deposited on the inner surfaces of the wing parts being mutually adhered to one another.

2. The fibre optic fusion splicer of claim 1, wherein the lift module comprises:
a cylinder tube; and
a piston rod being guided to the cylinder tube and being ascended and descended.

3. The fibre optic fusion splicer of claim 2, wherein the support part is fixedly coupled with the piston rod.

4. The fibre optic fusion splicer of claim 2, further comprising:
a push-button switch for ascending and descending the lift module.

5. The fibre optic fusion splicer of claim 4, wherein the push-button switch comprises:
a button unit;
a lifting member descending the piston rod by applying pressure on a spring when the button unit is pushed and ascending the piston rod by using a restoring force of the spring when the button unit is pushed once again; and
a fixing member fixing the lifting member to a position where the piston rod is descended or releasing a fixed state of the lifting member in accordance with the pushing operation performed on the button unit.

6. A fibre optic fusion splicer, comprising:
an alignment part fixing and aligning a first optical fibre and a second optical fibre that are to be fusion coupled;
a fusion splicing module being equipped with electrode bars for fusion coupling the first optical fibre and the second optical fibre being fixed and aligned to the alignment part;
an optical module photographing (or filming) an alignment state of the first optical fibre and the second optical fibre being achieved by the alignment part and a fusion coupling state of the first optical fibre and the second optical fibre being achieved by the fusion splicing module;
a support part having the fusion splicing module and the optical module equipped thereto;
a lift module ascending and descending the support part; and
a push-button switch for ascending and descending the lift module,
wherein the lift module comprises:
a cylinder tube; and
a piston rod being guided to the cylinder tube and being ascended and descended,
wherein the push-button switch comprises:
a button unit;
a lifting member descending the piston rod by applying pressure on a spring when the button unit is pushed and ascending the piston rod by using a restoring force of the spring when the button unit is pushed once again; and
a fixing member fixing the lifting member to a position where the piston rod is descended or releasing a fixed state of the lifting member in accordance with the pushing operation performed on the button unit.

7. The fibre optic fusion slicer of claim 6, wherein the support part is fixedly coupled with the piston rod.

8. The fibre optic fusion splicer of claim 6, wherein the alignment part comprises:
a first fixing part fixing a first holder having the first optical fibre accommodated therein; and
a second fixing part fixing a second holder having the second optical fibre accommodated therein.

9. The fibre optic fusion splicer of claim 8, wherein the first holder being fixed to the first fixing part accommodates a detachable optical connector including a ferrule having the first optical fibre enclosed therein, and
wherein a protective cover is equipped to a rear end of the optical connector, the protective cover covering a fused part of the first optical fibre and the second optical fibre by being adhered while facing into the fused part.

* * * * *